Oct. 23, 1945.   J. H. McILVAINE   2,387,280
OIL BURNER AND REGULATOR THEREFOR
Filed June 13, 1941   2 Sheets-Sheet 1
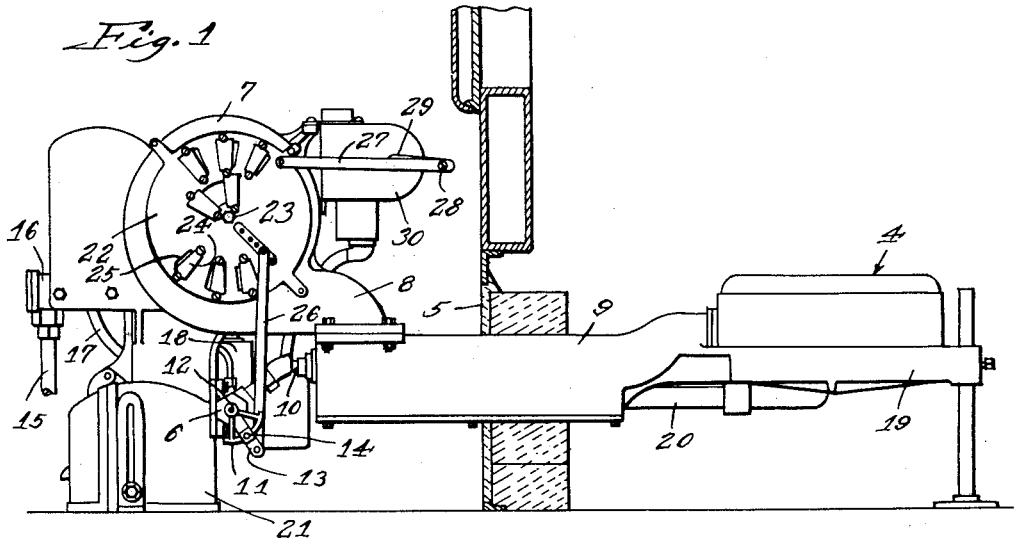
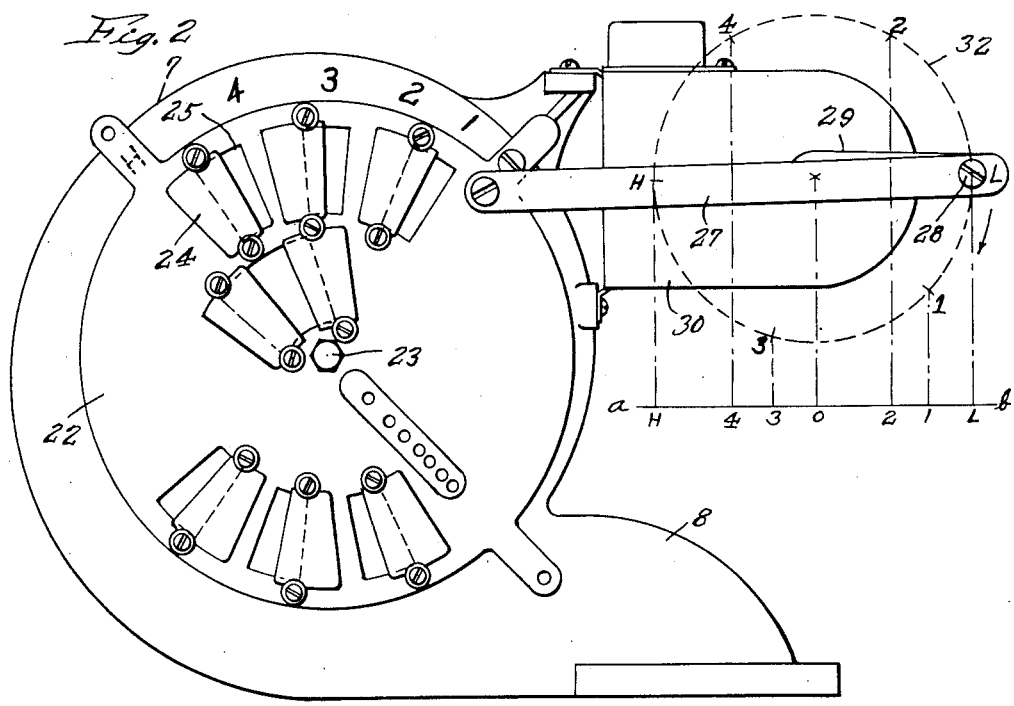
Inventor:
John H. McIlvaine
By
McCanna, Wintercorn & Morsbach
Attys.

Oct. 23, 1945.     J. H. McILVAINE     2,387,280
OIL BURNER AND REGULATOR THEREFOR
Filed June 13, 1941     2 Sheets-Sheet 2

Inventor:
John H. McIlvaine
By
McCanna, Wintercorn & Morsbach
Attys.

Patented Oct. 23, 1945

2,387,280

UNITED STATES PATENT OFFICE 2,387,280

OIL BURNER AND REGULATOR THEREFOR

John H. McIlvaine, Philadelphia, Pa., assignor to McIlvaine Burner Corporation, Chicago, Ill., a corporation of Illinois Application June 13, 1941, Serial No. 397,857

4 Claims. (Cl. 236—76)

This invention relates to liquid fuel or hydrocarbon burners, commonly known as oil burners, suitable for industrial or domestic heating, and is particularly concerned with an improved oil burner and regulator therefor.

Continuously operating oil burners of the kind disclosed in McIlvaine et al. Patent 2,080,289 have heretofore been operated with a step-by-step regulator under the control of a step-by-step room thermostat, so as to adjust the size of the flame from time to time so that the heat input will balance the heat loss of the building and thus maintain an even room temperature. The regulators heretofore available were designed to stop at evenly spaced points around a circle, but if the whole range of outdoor temperatures was taken into account in the division of the temperature range from say —2° for a high setting to 70° for a low setting, it invariably meant too large a temperature jump between settings of the regulator and correspondingly too coarse regulation of the flame. With coarse regulation of the flame there was the necessity for too frequent operation of the regulator and a tendency toward uneven heating of the building. It is, therefore, the principal object of my invention to provide an oil burner having a regulator designed and constructed to afford much finer regulation of the flame, more particularly through that outdoor temperature range in which most of the house heating invariably falls, so that the regulator is not compelled to operate nearly as often as heretofore and a more nearly constant temperature is maintainable.

In my Patent 1,654,658 I disclosed an oil feed valve interconnected with the oscillatable shutter of an air blower for delivering oil and air to the burner in predetermined proportions throughout a range of flames, the movement of the shutter and accompanying movement of the valve from one position to another being obtained by means of a rotary crank arm on a motor driven regulator. The only regulators heretofore available having been constructed, as stated before, to provide a given number of positions of the crank arm in equally spaced relation annularly with respect to one another, such six-position regulators would provide for only four positions of the shutter and valve, two of the crank positions corresponding to two other crank positions in so far as any change in the position of the shutter was concerned. Under the circumstances, if six positions of adjustment of the shutter were desired, it would require a ten-position regulator, at proportionately greater expense and a more complicated and proportionately expensive room thermostat as well as a more complicated and proportionately expensive cable. In accordance with my invention the present six-position regulator is constructed so that the two heretofore useless positions of the crank arm diametrically opposed to two other positions are eliminated and the crank arm is caused to assume two new positions not diametrically opposite to the two other positions, whereby to enable six-position regulation of the burner with as economical a regulator as was heretofore capable of only four-position regulation.

The invention is illustrated in the accompanying drawings, in which—

Figure 1 is a side view of an oil burner embodying my invention, illustrated installed in a domestic heater or furnace;

Fig. 2 is a side view of a portion of the burner of Figure 1 on a larger scale, indicating in dotted lines the path of movement of the crank pin and the six different positions of the pin corresponding to the six different positions of the shutter.

The same reference numerals are applied to corresponding parts throughout the views.

Figure 3:
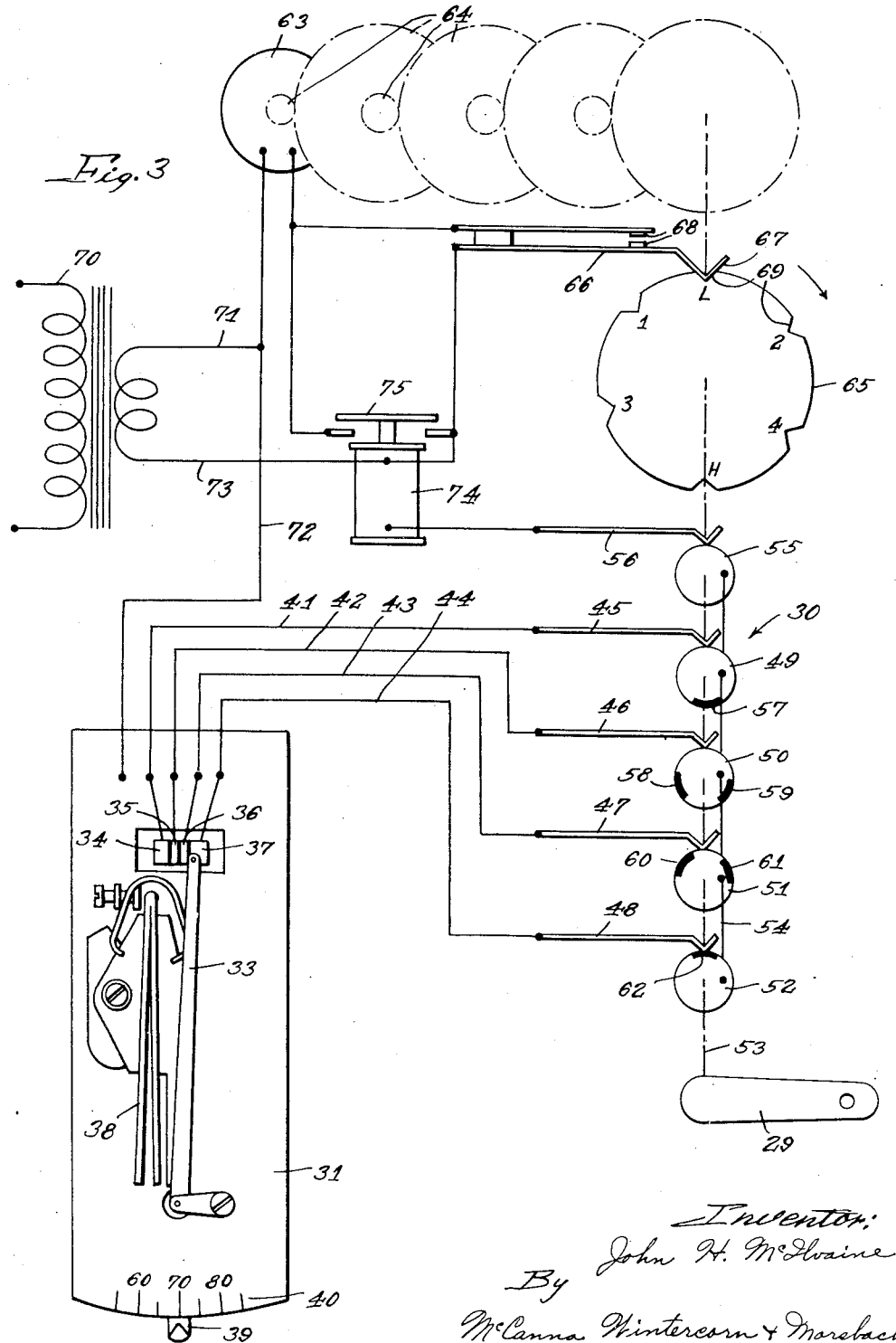
Fig. 3 is a wiring diagram.

Referring first to Figure 1, the reference numeral 4 designates the combustion head of the burner, disposed inside the heater or furnace 5, and arranged to have oil delivered thereto through a regulating valve 6 in a predetermined proportion to the air delivered by the blower 7. The blower 7 has a tangential discharge neck 8 communicating at its flanged downturned end with the flanged end of the combination air conduit and noise muffler 9 through which air is delivered to the combustion head 4. 10 is the oil feed pipe, which extends lengthwise inside the conduit 9 to the head 4 and is connected near the outer end of the conduit with the oil regulating valve 6. The quadrant 11, fixed to the rotatable stem 12 of the valve 6, has a lever 13 adjustably connected thereto, as indicated at 14, so that the stem 12 may be turned toward opening the valve or closing the same by movement of the lever in one direction or the other. The oil is ordinarily delivered by gravity to the burner through a pipe 15, where, after passing through a filter 16, the oil enters a float valve (not shown), the purpose of which is to maintain a constant level of fuel, so as to insure an even pressure and an even flame. The pipe 17 conducts the oil from the float valve to the solenoid valve 18, which permits an unrestricted flow of oil there-through so long as the current for the motor driving the blower 7 is not interrupted, the solenoid valve being kept open by the energization of its coil by the current for operating the motor. Upon interruption of the current, a main valve in the solenoid valve 18 is closed and the oil is by-passed through a secondary valve therein that is adjusted to reduce the flow to about one-third of the maximum capacity of the burner in order to maintain a reduced flame using natural draft, sufficient to keep the house warm until normal operation is resumed. The oil flows from the solenoid valve 18 into the regulating valve 6, and the latter is preferably of the type disclosed in Hollman Patent 2,080,272. The oil flows from the valve 6 to the combustion head through the pipe 10, and in the combustion head is discharged into a burner tray, where the oil is vaporized and mixed with the air from the blower 7 and burned, as disclosed, for example, in McIlvaine and Hollman Patent 2,208,851. In the event the flame in the combustion head is accidentally extinguished, oil overflows the tray into the bottom pan 19 of the head and is conducted through a pipe 20 into a trip bucket enclosed in the housing 21, as illustrated in McIlvaine and Hollman Patent 2,080,289, the trip bucket serving to operate a needle valve in the float valve so as to shut off communication between the supply pipe 15 and the float chamber and thus stop the delivery of oil.

The blower 7 has an air shutter plate 22, by means of which the amount of air delivered to the combustion head 4 may be regulated, by the turning of the plate about its center support 23 relative to an apertured side wall on the housing. The plate 22 conforms generally to what is shown in my Patent 1,797,293, there being small closure plates 24 arranged to be adjusted relative to openings 25 in the plate, so that only a predetermined amount of air will be allowed to enter the housing of the blower at each one of a series of positions, the shutter plate being turned one step at a time when these plates are being set, and adjustments of the appropriate closure plates being made at each step so as to secure the correct amount of air in proportion to the oil delivered to the combustion head. A link 26 provides an operating connection between the shutter plate 22 and the lever 13, previously described, so that the regulating valve 6 will be opened wider and wider at each step in the progressive opening of the shutter plate, whereby to secure a correct proportion of oil and air for each flame, from the low flame, which serves as a pilot, through the various intermediate sized flames to the high flame. Another link 27 provides an operating connection between the shutter plate 22 and the rotatable crank pin 28 on a rotatable crank arm 29 of the motor operated regulator 30. As explained in McIlvaine et al. Patent 2,093,829 and elsewhere, in automatic heating of a home with an oil burner of the type herein disclosed, a room thermostat like that shown at 31 in Fig. 3 located at a convenient point in the home, causes the regulator 30 to operate so as to regulate the size of the flame in the combustion head 4 with a view to balancing by heat input the heat loss of the building and thus maintain an even room temperature. With only four possible positions of the shutter plate 22 and regulator valve 6 for a complete turn of the regulator 30, the regulation of the flame was so coarse that the regulator had to operate too often and it was not possible to obtain as close uniformity of room temperature as desired. A four-position regulator required a 24° outdoor temperature jump between settings of the regulator to balance the heat loss of the building, as can be seen from the following schedule:

| Outdoor temperature | Regulator setting |
|---|---|
| 70° | Low |
| 46° | #2 |
| 22° | #4 |
| −2° | High |

Now, it happens that during more than 75% of the house heating season the outdoor temperature lies in the range between 34° and 58°, and with the old regulator which afforded the settings indicated above, there was only one setting for that range, namely, the #2 setting for 46° outdoor temperature. Manifestly, therefore, any outdoor temperature between 34° and 46° would necessitate shuttling of the regulator between #2 and #4 settings, and any outdoor temperature between 46° and 58° would necessitate shuttling of the regulator between the #2 setting and the low setting. In accordance with my invention, I have therefore provided for six-position regulation as follows:

| Outdoor temperature | Regulator setting |
|---|---|
| 70° | Low |
| 58° | #1 |
| 46° | #2 |
| 34° | #3 |
| 22° | #4 |
| −2° | High |

It is important to note that as compared with only one regulator setting in the important range from 34° to 58° where the bulk of the house heating season occurs, the regulator of my invention provides three settings—#1, #2 and #3. Bearing in mind that in an actual check-up for a complete heating season, it was found that approximately 30% of the operation occurs at or about 46°—in other words, the burner operates nearly a third of the time at that one setting—it is evident that the number of necessary operations of the regulator is greatly reduced, by providing the #2 regulator setting instead of relying on high to low operation only. Also bearing in mind that it was found that approximately 20% of the operation occurs at 58° and approximately 27% of the operation occurs at 34°, these two together representing nearly one-half of the total operation for which temperatures no regulator setting was provided heretofore, it follows that with my improved regulator the number of necessary operations of the regulator is further drastically reduced. Moreover, the fact that the outdoor temperature jump between settings is reduced from 24° to 12° throughout that range of outdoor temperatures in which the bulk of the house heating season occurs, it should be evident that the finer regulation of the flame which is obtained with my invention makes for closer uniformity of room temperature. A further advantage derived from this invention is that the greatest economy in oil and the least tendency for carbon formation with its attendant troubles go hand in hand with fairly steady operation in a given position of the regulator. In the final analysis, the present invention by providing closer regulation throughout the bulk of the house heating season makes more fully available the real advantages of continuous operation over off-and-on operation, the desideratum being continuous operation with a flame that is infinitely variable to continuous balance by proper heat input the fluctuating heat loss of the building so as to maintain an exactly constant room temperature.

Further, in accordance with my invention, I have provided for six-position regulation with a novel form of six-position regulator which in its old unimproved form was capable of only four-position regulation. Thus the regulator 30 shown in Fig. 2 is of the improved type, the dotted circle 32 indicating the path of movement of the crank pin 28 in which the six positions are designated L, 1, 2, 3, 4, and H to correspond to the schedule last given above. The crank arm 29 turns in a clockwise direction as indicated by the arrow traveling from low through positions 1 and 3 to high, and on the return from high to low, passing through the positions 4 and 2. Special attention is called to the fact that positions 2 and 3 are not diametrically opposed, and positions 1 and 4 are not diametrically opposed. More specifically stated, the projection of the crank 29 on a line $ab$, which may be considered as either parallel to or coincident with the diameter H—L of the circle 32 for each of the settings 1, 2, 3 and 4, has a different value, O—1 being greater than O—2 and less than O—L, while O—4 is greater than O—3 but less than O—H. It follows, therefore, that the shutter plate 22 and regulator valve 6 have a position of smallest opening at the low setting, and that the opening is increased progressively through settings 1, 2, 3 and 4, with the greatest opening in the high setting.

Referring now to Fig. 3, the reference numeral 33 designates the contact finger of the thermostat 31, which moves relative to the contact segments numbered 34 to 37, under the control of a thermo wafer 38 in accordance with change in temperature in the room. 39 is the usual setting indicator for the thermostat, shiftable in the well known manner relative to the temperature graduations indicated at 40. Four conductors 41–44 connect the contact segments 34–37 with four contact brushes 45–48, which ride on the contact discs 49–52. These discs are preferably sections of a circuit-breaker drum, the axis of which is indicated at 53, but they may, of course, be discs carried on a common shaft. The interconnection of the discs electrically is indicated diagrammatically by a conductor 54. A fifth contact disc is indicated at 55, connected electrically with the others as shown. The disc 55 has a brush 56 which rides on the periphery thereof and is in constant electrical connection therewith, since there are no insulated portions on the periphery thereof as there are, for example, at 57 on the periphery of the disc 49, at 58 and 59 on the periphery of the disc 50, at 60 and 61 on the periphery of the disc 51, and at 62 on the periphery of the disc 52. The drum or shaft 53 turns with the crank arm 29 previously mentioned. 63 is a small fractional horse-power electric motor connected through reduction gearing, indicated at 64, with the drum or shaft 53 to turn the same slowly whenever the electrical circuit through the motor is completed for operation of the regulator 30. A notched disc 65 on the drum 53 operates a make and break switch 66, the spring finger 67 of which closes the circuit through the switch contacts 68 when the disc 65 commences to turn and keeps these contacts closed until the finger drops into one of the notches 69. These notches are in circumferentially spaced relation on the periphery of the disc 65 to correspond to the different angular positions of the crank arm 29 and have accordingly been marked L, 1, 2, 3, 4, and H. 70 is a step-down transformer, having one side of the secondary winding connected, as at 71, to the ground conductor 72 that extends from the frame of the thermostat 31 to one terminal of the motor 63. The other side of the secondary winding is connected, as indicated at 73, to one end of the coil 74 of a relay switch 75, the other end of which coil is connected with the brush 56. The relay switch 75 is connected in series with the secondary winding of the transformer 70 so that when the coil 74 of this relay switch is energized and the switch is closed, the motor 63 will immediately start running. This occurs when the contact finger 33 of the thermostat 31 rides off from one contact segment onto another, when the thermostat is signaling for more heat or to shut down the burner after a rise in temperature in the room. In the first few turns of the motor 63, the contacts 68 of the make and break switch 66 are closed, and thereafter the continued operation of the motor 63 is assured until the finger 67 drops into the notch 69, that is associated with the particular one of the discs 49–52 that is associated with the contact segment engaged by the finger 33. The parts are shown at rest, with the regulator 30 on the low setting, but assuming that the temperature in the room drops so as to cause the finger 33 to move from the contact segment 37 onto the contact segment 36, the coil 74 of the relay switch 75 is promptly energized so to as close the relay switch 75 and start the motor 63. This circuit is traceable as follows: From one side 71 of the secondary winding of the transformer 70 through conductor 72 and finger 33 to the contact segment 36, thence through conductor 43 to the drum 53 and through disc 55 of the drum and its brush 56 through the coil 74 to the other side 73 of the secondary winding. Once the motor 63 is started and the make and break switch 66 has been closed, the motor 63 continues running until the disc 65 has turned to a position where the finger 67 of the make and break switch drops into the notch 69, numbered 1, at which point the brush 47 will also have moved onto the insulated segment 60, thus breaking the circuit also through the coil 74 to stop the motor. Later when the temperature in the room rises again, the contact finger 33 moves back into engagement with the contact segment 37, and at that time the motor 63 operates to turn the drum 53 through nearly a complete turn to bring the disc 65 back to the low position illustrated, with the brush 48 in engagement with the insulated segment 62. It will be seen that whereas the insulation segment 60 mentioned above is identified with the #1 position, the other segment 61 on the same disk 51 is identified with position #2. In other words, two different flame settings are obtainable from the one disk 51 and contact 36 connected therewith. In like manner, disk 50 has two insulation segments 58 and 59 identified with positions 3 and 4 respectively, so that two flame settings are obtainable from the one disk 50 and the contact segment 35 connected therewith. The notches 69 in the disk 65 are spaced angularly so that the notches marked L and H correspond to the insulation segments 62 and 57, respectively; notches marked 1 and 2 correspond to insulation segments 60 and 61, respectively, and notches marked 3 and 4 correspond to insulation segments 58 and 59, respectively. In that way the regulator arm 29 will stop in the low position, illustrated in Fig. 3, when the brush 48 stops on insulation segment 62 and the make-and-break switch finger 67 is engaged in the notch 69 marked L and the thermostat contact finger 33 is on contact 37, not calling for any additional heat. In like manner the arm 29 will stop in the #1 position, as described above, when the brush 47 engages insulation segment 60 and the make-and-break switch finger 67 engages in notch 69 marked 1 and the thermostat contact finger 33 engages contact 36, not calling for any additional heat. In like manner the arm 29 will stop in the #3 position when the brush 46 engages insulation segment 58 and the make-and-break switch finger 67 engages in notch 69 marked 3 and the thermostat contact finger 33 engages contact 35, not calling for any additional heat. In like manner the arm 29 will stop in the high position when the brush 45 engages insulation segment 57 and the make-and-break switch finger 67 engages in notch 69 marked H and the thermostat contact finger 33 engages contact 34. These are all successive positions attained in a movement of the finger 33 from right to left across the contact segments 34–37 calling for more and more heat, it being obvious that the movement of the finger 33 is, of course, very gradual, inasmuch as the temperature change in a room is gradual. In moving from left to right the finger 33 moves in response to calls for less and less heat, thus the regulator arm 29 stops in the #4 position when the finger 33 engages contact 35 and brush 46 engages insulation segment 59 and the make-and-break switch finger 67 engages in notch 69 marked 4. Should even less heat be called for and the contact finger 33 engage contact 36, the drum 53 will turn farther and move the regulator 29 to the #2 position when the finger 33 engages contact 36 and the brush 47 engages insulation segment 61 and the make-and-break switch finger 67 engages in notch 69 marked 2. Usually, however, the thermostat 31 will oscillate between two of the contact segments, the finger 33 moving to the left as more heat is called for and to the right as the heat demand is satisfied. The shuttling between the low position and the #1 position was described above. The shuttling back and forth between other settings of the regulator can be traced in the wiring diagram similarly as above, the regulator occasionally alternating 3—2—3—2, etc. and on other occasions 4—H—4—H, etc. instead of the L—1—L—1 etc. operation just described.

In operation, assuming that the thermostat is set at 70° and that there is a differential of ½° between contacts, as long as the room temperature remains at 70° or higher, the regulator calls for low flame only. Now, when the room temperature falls to 69½°, the regulator moves from low to #1 position, which will balance a heat loss from the building of one-sixth the maximum loss for which the burner and heating plant are designed. If the maximum heat loss to be expected is for a minimum outdoor temperature of −20°, then #1 flame will take care of the heat loss when the outside temperature is 70° minus one-sixth of 90° (the total spread to be met), which is 55°. If the outdoor temperature which caused the room temperature to fall is above 55° but less than 70°, then the #1 flame will overheat the building, cause the room temperature to rise back to 70°, thereby returning the regulator to low flame again. If the outdoor temperature is less than 55° but more than 40°, the #1 flame will not balance the heat loss, and the room temperature will continue to fall below 69½° until, at 69°, the second contact is made at the thermostat, which raises the flame to #3. But #3 is the half-open point and will take care of an outdoor temperature of 25°. So, the room starts to overheat until the thermostat moves back to the first contact above the low contact. In other words, the regulator goes through high flame and back down the other side until it stops at #2 position, which flame is just enough to balance the heat loss at 40°. Even this flame is a little too big, so the regulator goes back down to low in response to the rising temperature in the room, so that the flame varies from low to #1, to #3, to #2, and to low. The only time the regulator stands still is when the outdoor temperature is exactly such that one of the flame positions gives a heat input to exactly balance the heat loss. The regulator, on the other hand, is not caused to operate as much as might be assumed from the above description, because since there is never a total absence of heat supply the changes in room temperature are very slow and with a good heating system they are almost impossible to detect. To better illustrate the operation of the present combination of a six-position regulator with a four-contact thermostat, attention is called to the following chart:

| | Outdoor temperature | Room temperature | Regulator movement |
|---|---|---|---|
| | At 70 | 70 | On low. |
| | 70 to 55 | 70 to 69½ to 70 and repeat. | Low to 1 to low and repeat. |
| A | At 55 | 70 to 69½ and stay | Low to 1 and stay. |
| | 55 to 40 | 69½ to 69 to 69½ to 70 to 69½ and repeat. | 1 to 3 to 2 to low to 1 and repeat. |
| B | At 40 | 69½ to 69 to 69½ and stay. | 1 to 3 to 2 and stay. |
| | 40 to 25 | 69½ to 69 to 69½ and repeat. | 2 to 3 to 2 and repeat. |
| C | At 25 | 69½ to 69 and stay | 2 to 3 and stay. |
| | 25 to 10 | 69 to 68½ to 69 to 69½ to 69 and repeat. | 3 to high to 4 to 2 to 3 and repeat. |
| | At 10 | 69 to 68½ to 69 and stay. | 3 to high to 4 and stay. |
| | 10 to −20 | 69 to 68½ to 69 and repeat. | 4 to high to 4 and repeat. |
| | At −20 | 69 to 68½ and stay | 4 to high and stay. |

It might appear from the above that the six-position regulator of my invention requires more movements than a four-position regulator, but 86% of the heating season requires 50% or less of the maximum heat supply, and in that range the six-position regulator of my invention has three stopping places, marked A, B, and C in the above schedule. Furthermore, the changes in heat supply from one position to the next are only 16⅔% and, hence, the heat input to the building is much more uniform with a six-position regulator than with a four-position regulator. To illustrate the contrast in the operation of a four-position regulator in combination with a four-contact thermostat, attention is called to the following schedule:

| | Outdoor temperature | Room temperature | Regulator movement |
|---|---|---|---|
| | At 70 | 70 | On low. |
| | 70 to 40 | 70 to 69½ to 70 and repeat | Low to 2 to low and repeat. |
| D | At 40 | 70 to 69½ and stay | Low to 2 and stay. |
| | 40 to 10 | 69½ to 69 to 69½ and repeat. | 2 to 4 to 2 and repeat. |
| | At 10 | 69½ to 69 and stay | 2 to 4 and stay. |
| | 10 to −20 | 69 to 68½ to 69 and repeat. | 4 to high to 4 and repeat. |
| | At −20 | 69 to 68½ and stay | 4 to high and stay. |

Now, this operation might appear to be simpler than the operation of the six-position regulator of my invention, but bearing in mind that 86% of the heating season requires 50% or less of the maximum heat supply and in that range the four-position regulator has only one stopping place, marked D in the above schedule, at 40°, it is obvious that there is either too little or too much heat input most of the time, and accordingly many more operations of the regulator are required, and bearing in mind also the fact that the changes in heat input in moving from one position to the next in a four-position regulator are 33% of the total range, it is obvious that the heat input with that type of regulator is much less uniform. Summing up, therefore, the advantages of the present combination of a six-position regulator with a four-position thermostat are as follows:

(1) There are three stopping places, marked A, B, and C in the first schedule, all within the 86% range of winter operation as compared to only one stopping place, marked D in the second schedule, with the four-position regulator.

(2) The four-position thermostat requires only four contact segments 34-37 on the thermostat contact bar and as combined with the six-position regulator in accordance with my invention so that four contacts are made to do the work of six, the device is made simpler to manufacture and is available at a much lower cost, and, furthermore, the wiring from the thermostat to the regulator is accomplished with only five wires, there being one common wire connected to the moving contact finger 33 and four wires connected to the four contact segments 34-37, and (3) The four-position thermostat avoids the objections which a six-position thermostat that might otherwise be provided to give the desired operation would be subject to. That is to say, a six-position thermostat would not only involve greater cost for the thermostat, the regulator, and the wiring, but such a thermostat could not possibly operate nearly as smoothly and positively or with as close temperature regulation. To illustrate, a six-position thermostat would require two more intermediate contact segments and two more insulators, thereby doubling the total throw from low to high, and, whereas the four-position thermostat has a total throw of 1½° so that if it is set at 70° high flame comes on at 68½°, a six-position thermostat would have a 3° total throw from low to high necessitating a drop in room temperature to 67° before the high flame would come on.

It is believed the foregoing description conveys a good understanding of the objects and advantages of my invention. The appended claims have been drawn with a view to covering all legitimate modifications and adaptations.

I claim:

1. In an apparatus of the character described, a rotary circuit breaker drum, a plurality of brushes having wiping contact therewith and adapted individually to be electrically insulated therefrom by angularly spaced insulated portions on the periphery of said drum in predetermined positions of rotation of said drum with respect to said brushes, another brush having wiping contact with the periphery of said drum and adapted to remain in constant electrical connection therewith, a notched disk turning with the drum having notches in circumferentially spaced relation on the periphery thereof corresponding to the different angular positions at which the drum is destined to stop, only two of the notches being diametrically opposed to one another to determine opposed dead center positions, a make and break switch having a follower for operating the same riding on the periphery of said notched disk, a unidirectional electric motor, a reduction gear train operatively connecting the motor with said drum and disk, a relay switch connected on the one hand with the last named brush and on the other hand with the make and break switch and motor, and thermostatically actuated means electrically connected with the first mentioned brushes and the said relay switch and motor whereby in response to temperature changes said motor is started and stopped to impart rotary movement to the drum always in one direction to predetermined operative positions.

2. In an apparatus of the character described, a rotary circuit breaker drum, a plurality of brushes having wiping contact therewith and adapted individually to be electrically insulated therefrom by angularly spaced insulated portions on the periphery of said drum in predetermined positions of rotation of said drum with respect to said brushes, another brush having wiping contact with the periphery of said drum and adapted to remain in constant electrical connection therewith, a notched disk turning with the drum having notches in circumferentially spaced relation on the periphery thereof corresponding to the different angular positions at which the drum is destined to stop, only two of the notches being diametrically opposed to one another to determine opposed dead center positions, the angularly spaced insulated portions on the periphery of the aforesaid drum being angularly spaced to correspond with the angular spacing of the notches in said disk, a make and break switch having a follower for operating the same riding on the periphery of said notched disk, a unidirectional electric motor, a reduction gear train operatively connecting the motor with said drum and disk, a relay switch connected on the one hand with the last named brush and on the other hand with the make and break switch and motor, and thermostatically actuated means electrically connected with the first mentioned brushes and the said relay switch and motor whereby in response to temperature changes said motor is started and stopped to impart rotary movement to the drum always in one direction to predetermined operative positions.

3. In an apparatus of the character described, the combination of a four-position thermostat, comprising a body, four insulated contact segments thereon, and a contact finger movable on said body with respect to said contact segments in response to temperature change, a six-position regulator adapted to operate the control means for a continuously operating variable flame type of burner, said regulator including a rotary crank arm for operating the control means for the burner, a rotary circuit-breaker drum for turning said arm in which there are at least four contact disks and four contact brushes engaging the same each connected with one of the aforementioned contact segments, two of the contact disks each having a single insulated portion on the periphery thereof, the insulated portion of one of said two disks being spaced angularly approximately 180° from the insulated portion on the other of said two disks, and the other two contact disks each having two insulated portions on the periphery thereof in angularly spaced relation but less than 180° apart, one of the last mentioned pairs of insulated portions being on one side of center in relation to the other pair of insulated portions, an electric drive motor operatively connected with the drum to transmit drive thereto whenever the motor is energized, and electrical circuit means interconnecting the body of said thermostat and the drum with the motor and a source of electric current supply, whereby in response to temperature changes said motor is started and stopped to impart rotary movement to the drum always in one direction to predetermined operative positions.

4. An apparatus as set forth in claim 3, wherein the electrical circuit means includes a notched disk turning with the drum having notches in circumferentially spaced relation on the periphery thereof corresponding to the different angular positions at which the drum is destined to stop, the notches being angularly spaced to correspond with the angular spacing of the insulated portions of the contact disks of said drum, a make and break switch having an operator movable to open circuit position by engagement in the notches of said disk, and a relay switch continuously connected electrically on the one hand with the drum and on the other hand with the make and break switch, motor, and body of the thermostat.

JOHN H. McILVAINE.